United States Patent [19]

Koistinen et al.

[11] Patent Number: 5,512,141

[45] Date of Patent: Apr. 30, 1996

[54] DISTILLATION APPARATUS

[75] Inventors: Peter Koistinen, Espoo; Reijo Rantala, Laitila, both of Finland

[73] Assignee: Keeran Corporation N.V., Geneva, Switzerland

[21] Appl. No.: 75,499

[22] PCT Filed: Dec. 16, 1991

[86] PCT No.: PCT/FI91/00389

§ 371 Date: Aug. 16, 1993

§ 102(e) Date: Aug. 16, 1993

[87] PCT Pub. No.: WO92/10265

PCT Pub. Date: Jun. 25, 1992

[30] Foreign Application Priority Data

Dec. 14, 1990 [FI] Finland ............................ 906170

[51] Int. Cl.$^6$ .................. B01D 3/14; B01D 1/22; C01B 29/00
[52] U.S. Cl. ............ 202/182; 202/176; 202/267.1; 203/26; 203/86; 203/DIG. 4; 159/13.1; 159/13.3; 159/24.1; 159/28.6
[58] Field of Search ...................... 202/182, 176, 202/267.1, 236; 203/26, 86, DIG. 4, 89; 159/28.6, 24.1, 13.1, 13.3, DIG. 15

[56] References Cited

U.S. PATENT DOCUMENTS

| | | | |
|---|---|---|---|
| 3,161,574 | 12/1964 | Elam | 203/86 |
| 3,227,630 | 1/1966 | Beckman | 203/86 |
| 3,438,432 | 4/1969 | Wetch et al. | 203/86 |
| 4,076,576 | 2/1978 | Marttala . | |
| 4,235,281 | 11/1980 | Fitch et al. | 165/1 |
| 4,341,601 | 7/1982 | Hartig | 203/26 |
| 4,511,436 | 4/1985 | Din Nasser | 202/174 |
| 4,585,523 | 4/1986 | Giddings | 203/11 |
| 5,211,812 | 5/1993 | Vielberth et al. | 202/172 |

FOREIGN PATENT DOCUMENTS

| | | |
|---|---|---|
| 0034920 | 9/1981 | European Pat. Off. . |
| 0314261 | 5/1989 | European Pat. Off. . |

(List continued on next page.)

OTHER PUBLICATIONS

Office Action dated Feb. 14, 1994 of application Ser. No. 08/075,471, filed Aug. 11, 1993.
Australian Office Action dated Feb. 22, 1994 of corresponding Australian application of the present U.S. application Ser. No. 08/075,499, filed Aug. 16, 1993.

(List continued on next page.)

*Primary Examiner*—Robert J. Warden
*Assistant Examiner*—Christopher Y. Kim
*Attorney, Agent, or Firm*—Loeb & Loeb

[57] ABSTRACT

The invention relates to a distillation apparatus (1) which is suitable in particular for the distillation of sea water into fresh water. The apparatus comprises a plurality of flat, bag-like elements (3) formed from a thin film material such as plastic film and placed one against the other, the elements serving as heat exchangers between a vaporizing liquid flowing along the exterior surfaces of the element and a condensing vapor directed to the inside of the element, and a compressor (15) for increasing the pressure and temperature of the generated vapor before it is directed to the inside of the elements. The essential idea of the invention is that the inside of each element (3) is divided into parallel vapor ducts (12) extending vertically from one end of the element to the other, into which ducts the vapor is fed from apertures (25) at the upper edge of the element. At the upper end of each elements there may be a honeycomb-structured end strip (4) which contains parallel ducts (25) separated from each other by partition walls, the ducts feeding vapor to the inside of the element over the entire width of the element end. The strip (4) may also contain similarly formed ducts (26) which direct the liquid to be evaporated over the entire width of the element surface. At the lower end of the element there may additionally be a honeycomb-structured end strip (7) for collecting the produced distillate and for removing any unvaporized liquid.

27 Claims, 2 Drawing Sheets

FOREIGN PATENT DOCUMENTS

| | | |
|---|---|---|
| 1519742 | 3/1970 | Germany . |
| 2638339 | 3/1977 | Germany . |
| 127038 | 4/1973 | Norway . |
| 338059 | 8/1971 | Sweden . |
| 422366 | 3/1982 | Sweden . |
| 2120950 | 12/1983 | United Kingdom . |
| WO8802282 | 4/1988 | WIPO . |
| 9001977 | 3/1990 | WIPO . |

OTHER PUBLICATIONS

PCT International Search Report for PCT International application corresponding to co-pending application Ser. No. 08/075,471, filed Aug. 11, 1993.

International Preliminary Examination Report for PCT International application corresponding to co-pending application Ser. No. 08/075,471, filed Aug. 11, 1993.

PCT Written Opinion for PCT International application corresponding to co-pending application Ser. No. 08/075, 471, filed Aug. 11, 1993.

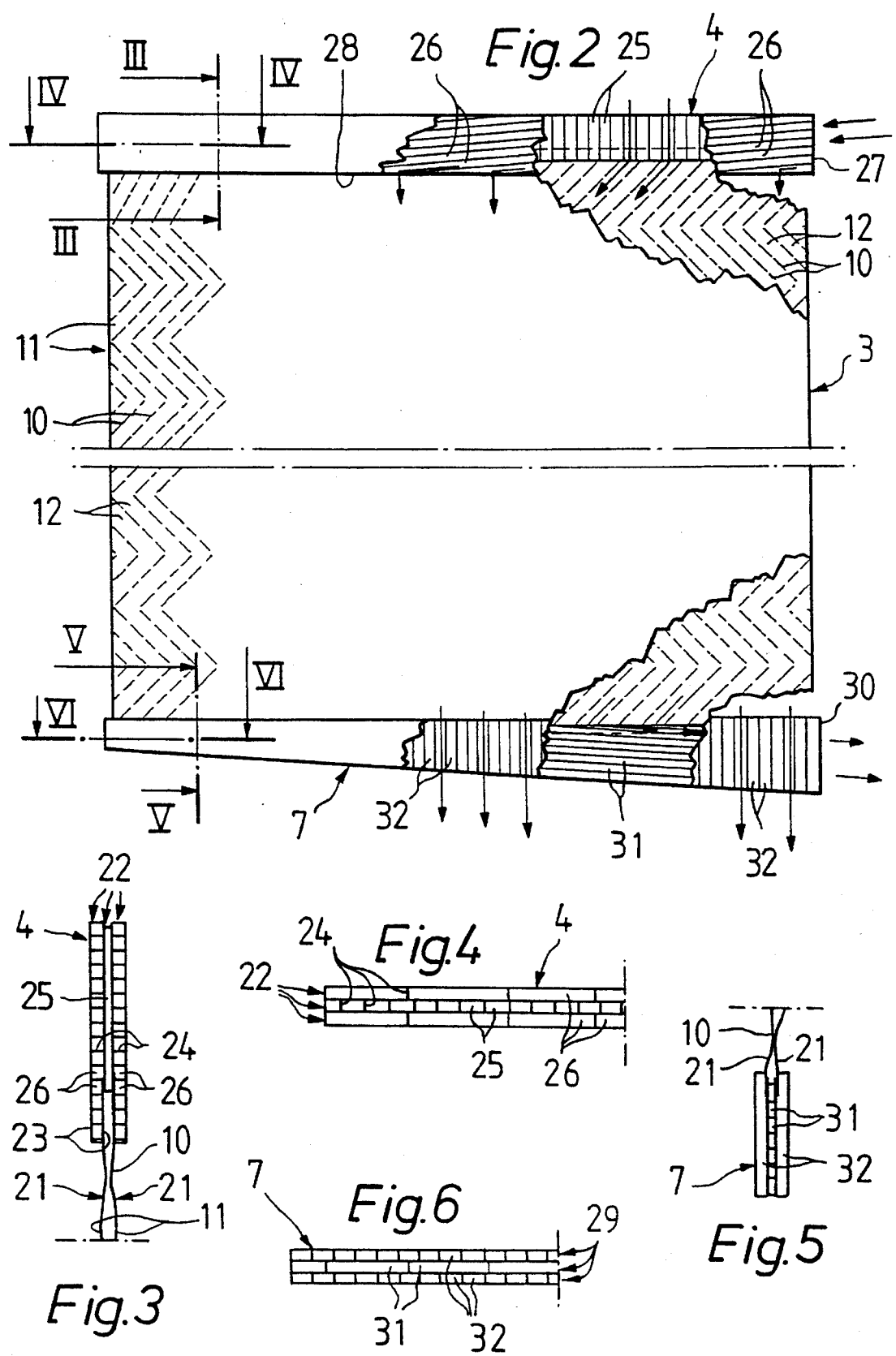

DISTILLATION APPARATUS

BACKGROUND OF THE INVENTION

The present invention relates to a distillation apparatus for the evaporation of a liquid and for its subsequent condensation, the apparatus comprising a plurality of flat, bag-like elements of a thin film material, such as plastic film, placed one against the other, the elements serving as heat exchangers between a vaporizing liquid which flows along the exterior surfaces of the elements and a condensing vapor which has been directed to the inside of the elements, and a compressor for increasing the pressure and temperature of the generated vapor before it is directed to the inside of the elements.

A distillation apparatus according to the above definition is described in, for example, FI Lay-Open Print 79948 and in the corresponding International Application Publication WO 90/01977. The primary use of distillation apparatuses of this type has been the production of fresh water from sea water. The tube or plate heat exchangers used in the prior art for the distillation of sea water were susceptible to contamination, and the corrosive nature of sea water caused problems of corrosion in them, necessitating the use of expensive, noncorrodible materials such as titanium and cupronickel. By the use of bag-like distillation elements made of plastic film these disadvantages have been eliminated, since plastic film is inexpensive, non-corrodible and, owing to its resilience, less susceptible to contamination. Any contaminant possibly adhering to the membranes can be shaken off by varying the pressure prevailing inside the elements. It has been possible to compensate for the poor thermal conductivity of plastic per se by using in the distillation apparatus a very thin film and a large number of thin elements having a large heat exchange surface.

The distillation apparatus according to said FI Lay-Open Print 79948 comprises, above the plastic membrane elements, a common distribution basin for the water to be evaporated, from which the liquid flows via pipes into the passages between the elements. The vapor generated on the exterior surfaces of the elements is directed to a blower, which blows it, at a higher pressure and temperature, to the inside of the elements through apertures in their sides. The system described has the disadvantage that, by means of it, the vapor to be condensed cannot be spread very evenly inside the elements, and subsequently part of the potential condensing efficiency of the apparatus remains unexploited. Also, in the apparatus disclosed, the spreading out of the liquid to be evaporated over the exterior surfaces of the elements does not occur in the best possible manner. Thus, heat exchange between the liquid vaporizing on the exterior surfaces of the elements and the vapor condensing inside the elements remains incomplete.

SUMMARY OF THE INVENTION

The object of the present invention is to provide a distillation apparatus in which heat exchange is enhanced especially by causing the vapor to be condensed to spread more evenly than in prior art inside the elements. The invention is characterized in that the inside of each bag-like element is divided into parallel vapor ducts extending vertically from one end of the element to the other, and that the feeding of vapor into the said ducts is arranged to take place from apertures located at the upper edge of the element and leading to the inside of the element.

By the system according to the invention, vapor can be directed to the inside of the elements and be caused to flow in them from the top downwards as an even flow distributed over the entire width of the elements. The condensing efficiency of the elements can thus be exploited maximally.

The vapor ducts to be formed in the bag-like elements may, according to the invention, be produced by seaming the opposite membranes of each element to one another along vertical seaming lines. By leaving in the seaming lines breaks at which the parallel ducts communicate with each other, an evening-out of the flow is further promoted by enabling the vapor and the liquid condensing from it to pass to some extent from one duct to another.

The feeding in of the vapor to be condensed can advantageously be arranged to take place via a honeycomb-structured end strip having substantially the width of the element and being located at the upper edge of each element. Such an end strip, which contains a plurality of parallel feeding ducts separated from each other by partition walls enables vapor to be fed evenly to the inside of the element and serves at the same time as a support part which facilitates the handling and installation of the element.

According to one preferred embodiment of the invention, the honeycomb-structured end strip preferably comprises a honeycomb board in which the space between two opposite walls is divided by transverse, mutually parallel partition walls into parallel ducts of equal width. Such a plastic honeycomb board is a commonly available commercial product, which has so far been used in various support and insulation structures in which the ducts have constituted voids providing insulation and making the structure lighter. In the present invention, however, they serve as a simple and inexpensively produced flow-channel system which feeds the liquid evenly to the inside of the element over the entire width of the end of the element, and is not susceptible to the corrosive action of the liquids being distilled.

The vapor-feeding ducts contained in the end strip of the element are preferably substantially vertical, the vapor-feeding direction corresponding to the principal flow direction of the vapor in the vapor ducts formed inside the element. The orientation of the feeding ducts can be achieved simply by cutting the end strip out of a larger honeycomb board made up of two opposite walls and of mutually parallel partition walls between them, the cut being at a suitable angle to the said partition walls.

One preferred embodiment of the invention is characterized in that the end strip of the element comprises a honeycomb in which the space between two opposite walls is divided into parallel ducts feeding the vapor to be condensed to the inside of the element, and in which at least one of the adjacent spaces between two opposite walls is divided into parallel ducts feeding the liquid to be evaporated onto the exterior surface of the element. By this system there is accomplished simultaneously both a maximally even distribution of the vapor to be condensed inside the element and a maximally even distribution of the liquid to be evaporated over the exterior surface of the element, thus achieving the best possible heat exchange between the condensing vapor and the vaporizing liquid.

The most preferred embodiment of the system referred to above is that the honeycomb constituting the end strip has, on both sides of the vapor-feeding ducts leading to the inside of the element, feeding ducts which distribute the liquid to be evaporated onto both exterior surfaces of the element.

In addition to the honeycomb-structured end strips at the upper ends of the elements, the distillation apparatus according to the invention may also have at the lower end of each element a honeycomb-structured end strip having substantially the width of the element, the end strip containing a plurality of outlet ducts for the liquid condensed inside the element. For the end strip of the lower end of the element it is also possible to use commercially available plastic honeycomb boards in which the space between two opposite walls is divided by transverse, mutually parallel partition walls into parallel ducts of equal width.

The end strip at the lower end of the element is preferably made up of a honeycomb in the middle of which the space between two walls is divided into parallel outlet ducts for the liquid condensed inside the element, and in which, on one side, preferably on both sides of the said space, the space between two opposite walls is divided into outlet ducts for the liquid which has remained unvaporized on the exterior surface of the element. The outlet ducts for the condensed liquid, which constitutes the distillate obtained, may be directed to a common collection space at the side of the elements, whereas the outlet ducts for the unvaporized liquid are preferably vertical, in which case they will discharge the liquid to the bottom of the apparatus by the shortest route.

BRIEF DESCRIPTION OF THE DRAWINGS

The invention is described below in greater detail with the help of examples, with reference to the accompanying drawings, in which FIG. 2 depicts a side view of one bag-like element belonging to the distillation apparatus according to FIG. 1, FIG. 3 depicts a section through III—III in FIG. 2, FIG. 4 depicts a section through IV—IV in FIG. 2, FIG. 5 depicts a section through V—V in FIG. 2, and FIG. 6 depicts a section through VI—VI in FIG. 2.

DESCRIPTION OF THE PREFERRED EMBODIMENT

Figure 1:
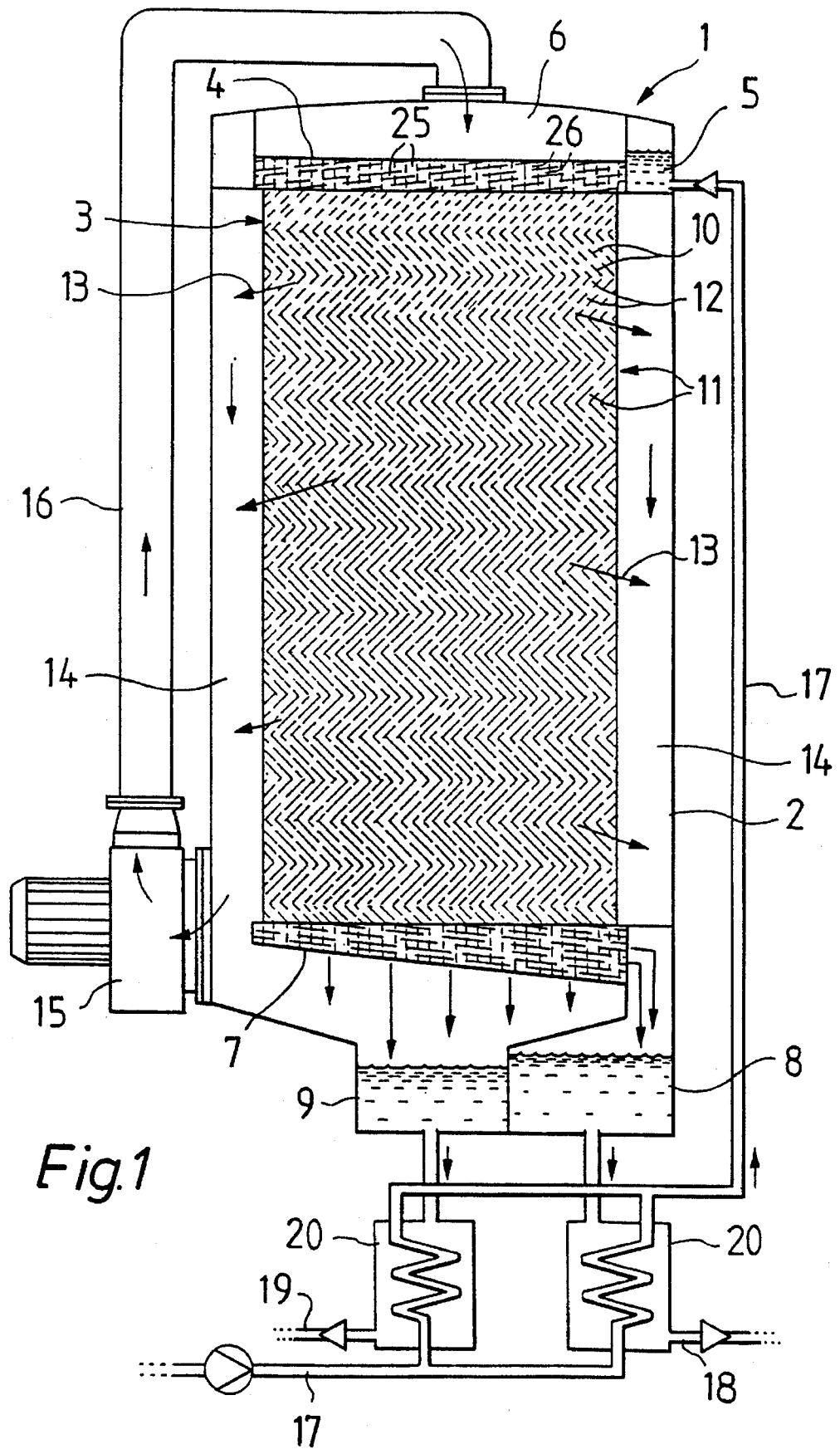
FIG. 1 depicts a schematic cross section of one distillation apparatus according to the invention.

The distillation apparatus according to FIG. 1 comprises a frame 2 in the space defined by which there is a plurality of flat, bag-like elements 3 made of thin plastic film, placed one against the other. At the upper end of each element 3 there is a honeycomb-structured plastic end strip 4, one end of which communicates with a distribution basin 5 containing the liquid to be evaporated, common to all the elements, and its upper side communicates with the feeding chamber 6 containing the vapor to be condensed, also common to all the elements. At the lower end of each element 3 there is a honeycomb-structured plastic end strip 7, one end of which communicates with a collection vessel 8 for the distillate condensed from the vapor, and under which the bottom of the frame has been formed into a collection basin 9 for the liquid which has remained unvaporized in the apparatus. Between the strips 4 and 7 each bag-like element 3 is made up of two opposite plastic membranes 11 which have been welded to each other along vertical zigzagging seaming lines 10. The seaming lines 10 delimit, inside the element 3, vertical ducts 12 extending from one end of the element to the other, in which ducts the vapor condenses into liquid. The seaming lines 10 are not continuous but include breaks at which vapor or liquid may to a limited degree pass from one duct 12 to another. The vapor generated from the liquid fed onto the exterior surfaces of the elements 3 flows from the spaces between the elements, in accordance with arrows 13 in FIG. 1, into a suction chamber 14 surrounding the elements, from which chamber a blower 15 serving as the compressor blows the vapor, at a higher pressure and temperature, via a pipe 16 into the vapor-feeding chamber 6 at the upper end of the apparatus.

The inlet pipe for the liquid to be distilled, which leads to the distribution basin 5, is indicated by reference numeral 17 in FIG. 1. The outlet pipe for the distillate obtained is indicated by numeral 18, and the outlet pipe for the unvaporized liquid by numeral 19. The discharging distillate and the liquid which has remained unvaporized are used in heat exchangers 20 for preheating the liquid to be distilled.

The structure and operation of each individual element 3 of the distillation apparatus 1 can be seen in greater detail in FIGS. 2–6. The function of the end strip 4 at the upper end of the element is to distribute the vapor to be condensed, blown into the feeding chamber 6, as evenly as possible into the vertical ducts 12 inside the element and to distribute the liquid to be evaporated, which is in the distribution basin 5, as evenly as possible onto the opposite exterior surfaces 21 of the element. The function of the end strip 7 at the lower end of the element, for its part, is to collect the liquid condensed in the ducts 12 inside the element and to direct it as the obtained distillate to the collection vessel 8 and to allow the liquid which has remained unvaporized on the element surfaces 21 to flow into the collection basin 9 at the bottom of the apparatus.

The upper end strip 4 of the element comprises, in accordance with FIGS. 2–4, a honeycomb produced from three opposite, substantially rectangular plastic honeycomb boards 22. In each of these boards 22 the space between two opposite walls 23 is divided by transverse, mutually parallel partition walls 24 into parallel ducts of mutually equal width. The ducts in the middle honeycomb board of the strip form the ducts 25 leading to the inside of the element, for the vapor to be condensed, and the ducts in the honeycomb boards on their both sides constitute the feeding ducts 26, leading to the opposite exterior surfaces 21 of the element, for the liquid to be evaporated. As can be seen in FIG. 2, the feeding ducts 25 for the vapor to be condensed are vertical, in which case they direct the vapor vertically into the ducts 12 produced inside the element by means of seams, whereas the feeding ducts 26 for the liquid to be evaporated run obliquely from the end side 27 of the strip 4 to the bottom side 28 of the strip, from which the liquid discharges onto the element surfaces 21. Both the vapor directed to the inside of the element 3 and the liquid directed onto its surfaces 21 can thus be distributed evenly over the entire width of the element, whereby the best possible heat exchange is accomplished between the vapor phase and the liquid phase.

The honeycomb-structured end strip 7 at the lower end of each element is structurally similar to the end strip 4 of the upper end of the element. There is, however, the difference that, of the three opposite honeycomb boards 29 of the strip 7, the middle one contains ducts 31 which lead obliquely towards the end 30 of the strip, communicate with the vertical ducts 12 seamed inside the element, and serve as outlet ducts for the liquid or condensate formed inside the element, whereas in the honeycomb boards on both sides of the ducts 32 are vertical and serve as outlet ducts for the liquid remaining unvaporized.

For an expert in the art it is evident that the various embodiments of the invention are not restricted to the above example but may vary within the scope of the accompanying claims. It is, for example, advantageous if the vertical zigzagging ducts 12 in adjacent elements run cross-wise in relation to each other, in which case the elements will not adhere to each other and the downward-flowing liquid to be evaporated will remain more evenly distributed on the exterior surfaces 21 of the elements. If the elements 3 are identical, this requires the reversal of every second element, in which case the liquid-distribution basin 5 and the distillate-collection vessel 8 in the apparatus must be connected to both ends of both the upper end strips 4 and the lower end strips 7.

The uses of the distillation apparatus according to the invention may also vary. In addition to the distillation of sea water, the apparatus is also applicable, for example, to the concentration of various solutions and suspensions, such as the waste waters from bleaching in pulp mills.

We claim:

1. In a distillation apparatus for the evaporation of a liquid for its subsequent condensation, the apparatus comprising a housing, a plurality of flat, bag-like heat exchange elements formed from thin film material and provided in the housing, the heat exchange elements having exterior surfaces for evaporating vaporizing liquid to generate vapor, interior spaces for condensing the vapor into a condensed liquid, an upper end, and a lower end opposing the upper end, the heat exchange elements being placed one against the other; means for directing vaporizing liquid along the exterior surfaces of the heat exchange elements; a compressor for increasing the pressure and temperature of the generated vapor; and means coupled to the compressor for directing the vapor into the interior spaces of the heat exchange elements, the improvement comprising:

each of the interior spaces of the bag-like heat exchange elements being divided into a plurality of parallel vapor ducts extending vertically from the upper end to the lower end thereof; and vapor feeding apertures arranged along the upper end of the heat exchange element and communicating with the parallel vapor ducts.

2. A distillation apparatus according to claim 1, wherein each of the bag-like heat exchange elements includes at least two opposite membranes and wherein the vapor ducts are produced by seaming the opposite membranes to each other along vertical seam lines.

3. A distillation apparatus according to claim 2, the seam lines have breaks for communicating the parallel vapor ducts with each other.

4. A distillation apparatus according to any one of claims 1–3, further including a honeycomb-structured end strip provided at the upper end of the heat exchange elements, the end strip having substantially the width of the element, and including parallel feeding ducts communicating with the interior space of the element.

5. A distillation apparatus according to claim 4, wherein said ducts are substantially vertical.

6. A distillation apparatus according to claim 4, wherein the end strip comprises a plastic honeycomb board including two opposite walls defining a space therebetween, said space being divided by transverse, mutually parallel partition walls into parallel ducts of equal width.

7. A distillation apparatus according to claim 4, wherein the end strip includes a first honeycomb including two opposite walls defining a first space therebetween, said space being divided into parallel ducts for feeding the condensing vapor to the interior of the element, said end strip further includes at least one set of two opposite walls defining a second space therebetween adjacent the first space, said second space being divided into parallel ducts for feeding the vaporizing liquid onto the exterior surface of the element.

8. A distillation apparatus according to claim 1, further including a honeycomb-structured lower end strip provided at the lower end of each of the heat exchange elements, the lower end strip having substantially the width of the element, and including a plurality of outlet ducts for discharging the condensed liquid formed inside the interior space of the heat exchange element.

9. A distillation apparatus according to claim 8, wherein the lower end strip comprises a plastic honeycomb board including two opposite walls defining a third space therebetween, said third space being divided by transverse, mutually parallel partition walls into parallel ducts of equal width.

10. A distillation apparatus according to claim 8, wherein a portion of the vaporizing liquid remains unvaporized and the lower end strip comprises a honeycomb including two opposite walls defining therein a fourth space therebetween, the fourth space being divided into a plurality of parallel outlet ducts for discharging the liquid condensed inside the interior space of the heat exchange element, the lower end strip further including two opposite walls defining a fifth space therebetween adjacent the fourth space, the fifth space being divided into a plurality of outlet ducts for discharging the unvaporized liquid.

11. A distillation apparatus according to claim 1, wherein the thin film material comprises a plastic film.

12. A distillation apparatus according to claim 1, further comprising a vapor feeding chamber above the heat exchange elements, and a plurality of vapor feeding ducts located at the upper end of the heat exchange elements for coupling the vapor feeding chamber and the vapor feeding apertures and for directing the vapor into the parallel vapor ducts.

13. A distillation apparatus according to claim 12, wherein the vapor feeding ducts are vertically oriented for substantially vertically directing the vapor into the parallel vapor ducts.

14. A distillation apparatus according to claim 12 or claim 13, wherein the vapor feeding ducts are arranged along substantially the entire width of the heat exchange elements for distributing the vapor over substantially the entire width of the interior space of the heat exchange elements.

15. A distillation apparatus according to claim 1, wherein the vapor feeding apertures are arranged along substantially the entire width of the heat exchange elements for distributing the vapor over substantially the entire width of the interior space of the heat exchange elements.

16. In a distillation apparatus for the evaporation of a liquid for its subsequent condensation, the apparatus including a housing, a plurality of vertically disposed heat exchange elements within the housing, each of the heat exchange elements defining an upper end, an evaporating surface for evaporating vaporizing liquid and a condensing surface for condensing vapor generated from the vaporizing liquid into a condensed liquid, the improvement comprising:

a plurality of vapor feed apertures communicating with the condensing surface and arranged along substantially the entire width of the heat exchange element for distributing the vapor over substantially the entire width of the condensing surfaces of the heat exchange elements.

17. A distillation apparatus according to claim 16, wherein two opposing condensing surfaces define a condensing space, the condensing space being divided into a plurality of condensing ducts, and wherein each of the vapor feed apertures communicates with each condensing duct.

18. A distillation apparatus according to claim 17, wherein the two opposing condensing surfaces comprise two opposing plastic membranes, the opposing plastic membranes being welded to each other along vertical zigzag seam lines to define a first plurality of parallel zigzag vapor feed ducts.

19. A distillation apparatus according to claim 18, wherein a second plurality of parallel zigzag vapor feed ducts adjacent to the first plurality of parallel zigzag vapor feed ducts run cross-wise in relation to each other.

20. A distillation apparatus according to claim 19, wherein the seam lines are non-continuous and define openings for allowing vapor or condensate to pass from one duct to another.

21. In a method of evaporating water from an aqueous solution for its subsequent condensation in a distillation apparatus, the distillation apparatus including a housing having a vapor feeding chamber, a plurality of vertically disposed heat exchange elements within the housing, each of the heat exchange elements being defined by an upper end and a lower end, and having at least an evaporating surface for evaporating vaporizing liquid and a condensing surface for condensing vapor generated from the liquid into a condensed liquid, the condensing surface communicating with the vapor feeding chamber, the improvement comprising:

feeding a condensing vapor through a plurality of vapor feed apertures disposed at the upper end of the heat exchange elements along substantially the entire width of the heat exchange elements for distributing the condensing vapor over substantially the entire width of the condensing surfaces of the heat exchange elements.

22. A method according to claim 21, wherein each heat exchange element has two opposing condensing surfaces which defines a condensing space, the condensing space being divided into a plurality of condensing ducts, and wherein each of the vapor feed apertures communicates with each condensing duct.

23. A method according to claim 22, wherein the condensing vapor is substantially vertically directed into the condensing ducts.

24. A method according to claim 23, wherein the distillation apparatus has a plurality of vertical vapor feed ducts disposed at the upper end of each of the heat exchange elements, each of the vertical vapor feed ducts communicating with each of the vapor feed apertures, for feeding the condensing vapor substantially vertically into each of the condensing ducts.

25. A distillation apparatus comprising:

a housing having a vapor feeding chamber adjacent a top portion of the housing:

a plurality of vertically disposed heat exchange elements within the housing, each of the heat exchange elements being defined by an upper end, a lower end and two side ends, and having an evaporating surface and a condensing surface, the condensing surface communicating with the vapor feeding chamber; and a plurality of first sets of vapor feed apertures communicating with the vapor feeding chamber and with the condensing surface of each of the heat exchange elements, and a plurality of second sets of liquid feed apertures communicating with the evaporating surface of each of the heat exchange elements;

the vapor feed apertures arranged along substantially the entire width of the heat exchange element for distributing the vapor over the entire width of the condensing surfaces of the heat exchange elements.

26. A distillation apparatus according to claim 25 further comprising an upper end honeycomb structured strip extending substantially along the width of the heat exchange elements, the upper end honeycomb structured strip having a plurality of first sets of vapor feed ducts communicating with the vapor feed apertures and with the condensing surface of each of the heat exchange elements, and a plurality of second sets of liquid feed ducts communicating with the second sets of liquid feed apertures and the evaporating surface of each of the heat exchange elements.

27. A distillation apparatus comprising:

a housing having a vapor feeding chamber adjacent a top portion of the housing:

a plurality of vertically disposed heat exchange elements within the housing, each of the heat exchange elements being defined by an upper end, a lower end and two side ends, and having an evaporating surface and a condensing surface, the condensing surface communicating with the vapor feeding chamber; and a plurality of first sets of vapor feed apertures communicating with the vapor feeding chamber and with the condensing surface of each of the heat exchange elements, and a plurality of second sets of liquid feed apertures communicating with the evaporating surface of each of the heat exchange elements, wherein the first sets of vapor feed apertures and the second sets of liquid feed apertures are disposed alternately with each other;

the vapor feed apertures arranged along substantially the entire width of the heat exchange element for distributing the vapor over the entire width of the condensing surfaces of the heat exchange elements.

* * * * *